Oct. 7, 1952 J. H. HOMRIGHOUS 2,613,276

MULTIPLEX TIME DIVISION RADIOPHONE SYSTEM

Filed Jan. 7, 1949 2 SHEETS—SHEET 1

INVENTOR.

John H. Homrighous

MULTIPLEX TIME DIVISION RADIOPHONE SYSTEM

Filed Jan. 7, 1949 2 SHEETS--SHEET 2

INVENTOR.

John H. Homrighous

Patented Oct. 7, 1952

2,613,276

UNITED STATES PATENT OFFICE 2,613,276

MULTIPLEX TIME DIVISION RADIOPHONE SYSTEM

John H. Homrighous, Oak Park, Ill.

Application January 7, 1949, Serial No. 69,772

20 Claims. (Cl. 179—15)

This invention relates to a communication system and more particularly to a time division multiplex radiophone system for a single group of mobile or fixed stations per carrier wave.

One of the main objects of my invention is to provide an improved radiophone system wherein a relatively large group of mobile and fixed stations may each be assigned individual pairs of channels on a time division basis through a common carrier wave.

Another object is to provide improved channel selecting circuits whereby a calling station may produce synchronizing signal pulses to in turn produce timing signal pulses at both the calling and called stations to control the transmission and reception of message signals at both stations.

To provide apparatus and suitable circuits at each station in the system to produce recurring synchronizing signal pulses and channel timing signal pulses is another object of my invention.

An additional object is to provide improved means at a calling station to prevent synchronizing signal transmission therefrom if synchronizing signals are being transmitted from another station in the system.

Another object of my invention is to provide an improved pulse generator comprising apparatus connected in series arrangement so that a single pulse having been initiated will be reproduced with a series of channel timing pulses in successive rotation.

Still another object is to provide, in a radio communication system in which each group of subscriber stations is capable of being called over a single carrier wave, oscillator means whereby any station served by one carrier wave may call any other station in the system which is served by the same or a different carrier wave.

A message in this specification is to be understood to include any intelligence or any portion of any intelligence representative of voice controlled electrical signals and any control or coded electrical signals.

A channel in this specification is to be understood as a track or course for the transmission of electrical signals, or a track or course for the transmission of electrical signals during a recurring period of time, and may be one of a number of channels in a transmission path for the transmission of signals representative of any intelligence.

A path in this specification is to be understood as comprising a plurality of channels for the transmission of message and related signals.

In the present application a single recurring station control pulse or synchronizing signal pulse may be produced and transmitted at one station to in turn produce a series of different pairs of recurring timing pulses at all the other stations, thereby controlling message signal transmission from all the stations in the system, whereas in my prior application, Serial No. 13,243, filed March 5, 1948, as many as four different station pulses may be utilized to select four communication paths over a single carrier wave, or carrier waves of the same wave length for four different stations.

There have been developed radiophone systems wherein a number of stations may be individually signaled over a single carrier wave in different recurring periods of time. Also other systems have been developed wherein a number of stations having code ringing selectors may be individually signaled through operation of the ringing selectors. But in this latter system signaling and talking between a pair of stations may utilize the entire transmitting time for the carrier wave. In the instant case a number of paths for two-way communication may be provided over a single carrier wave between different stations.

One of the main advantages of the instant time division multiplexing system is in developing station synchronizing signal pulses at any station when initiating a call, unless synchronizing signals are being transmitted from another station, and in transmitting these pulses over a carrier wave common to all the stations. The first station initiating a call is the controlling station, but with no call in progress synchronizing signals will not be transmitted and the receiver at each station will be in stand-by condition.

In the multi-path, multi-channel per path carrier wave radiophone system described herein, I may produce station synchronizing or control pulses at one station and transmit these pulses for utilization by the other stations in the system. These synchronizing pulses at each station may through delay networks produce different pairs of timing pulses in successive rotation to condition the various stations during different recurring periods of time for the transmission and reception of message signals.

The time division radiophone system described herein may be applicable to many communication services by wireless transmission, such as police networks, public utility networks, bus and taxi systems; and from the description to follow it will be apparent that there are many other possibilities.

The instant radiophone system may comprise a plurality of stations; each station may be assigned an incoming channel to receive message signals, and an outgoing channel for transmitting message signals so that a number of secret two-way communications may be taking place at the same time over carrier waves of the same frequency transmitted from different stations. One carrier wave may be employed for a relatively large group of stations, and other wave lengths may be utilized for calling stations in other groups. One station may transmit fragmentary portions of signals representative of a message during selected periods, and other stations may transmit signals during other selected periods. Likewise the receivers in each station may receive message signals during selected periods.

In the radiophone system described herein I may employ high or ultrahigh frequency carrier waves; preferably a high frequency carrier wave frequency modulated is utilized. However, it is to be understood that the principles involved may be equally applicable to carrier waves of any other wave length. Also phase modulation or amplitude modulation may be employed.

Other objects and advantages of my invention will appear from the following description taken in connection with the accompanying drawings in which.

Figure 1:
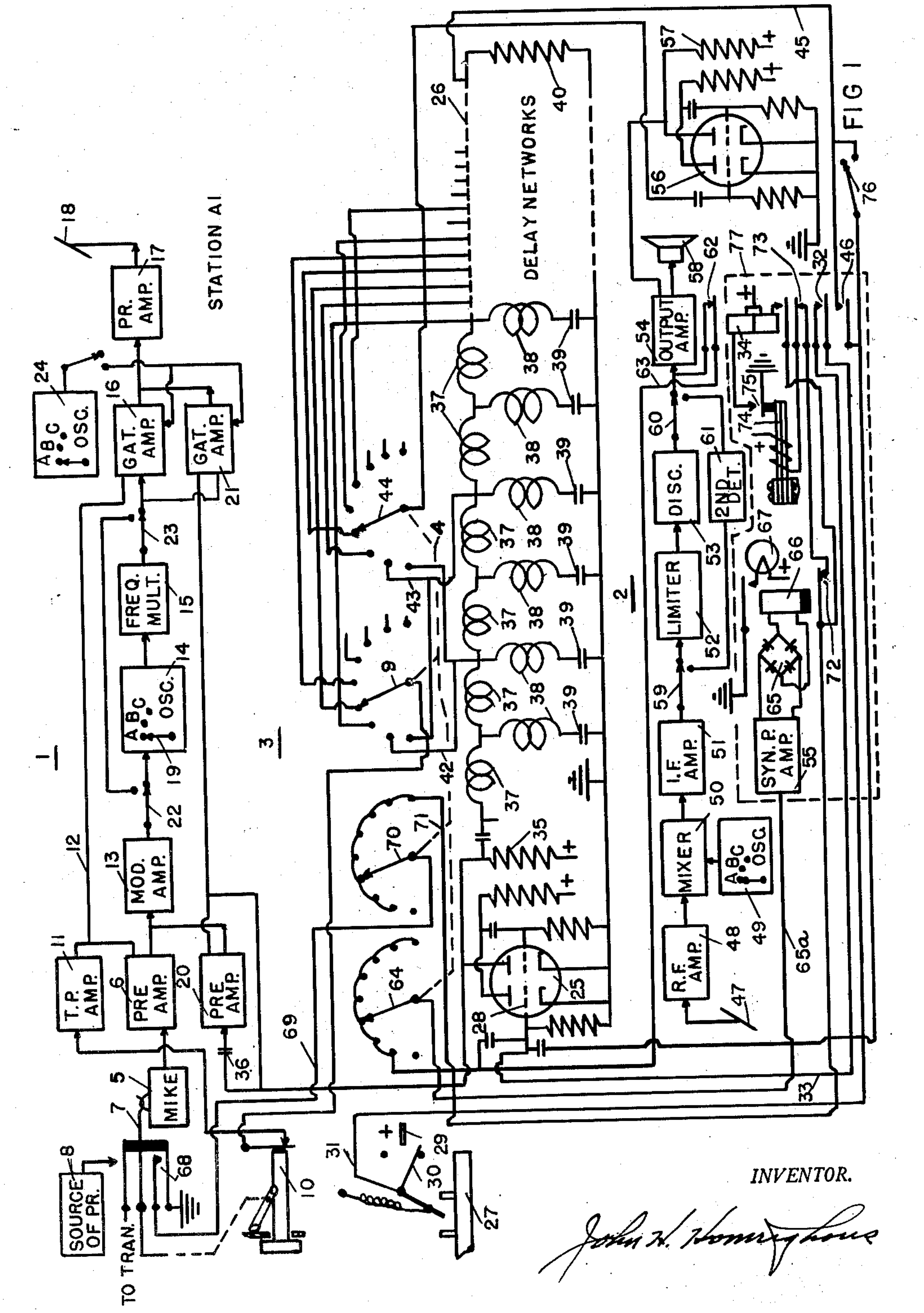
Figures 1 and 2 are block and circuit diagrams for two transmitter-receiver stations.

Figure 1 shows a radio transmitter-receiver station. This station may comprise a transmitter 1, receiver 2, and a pulse generator with a channel selecting device 3, common to both the transmitter and the receiver. The transmitter may transmit recurring synchronizing signal pulses and message signals during any selected period depending upon the station called. When the station is called, the transmitter transmits message signals modulated on a carrier wave during a predetermined recurring period assigned to the station or over its assigned outgoing channel. Likewise when the station is called, the receiver may receive the synchronizing pulses from the calling or another station in the system and message signals during a predetermined recurring period assigned to the station or over its assigned incoming channel. Each station in the group is assigned an incoming or call channel and an outgoing channel which may be designated to correspond to the station number.

Figures 2, 3:
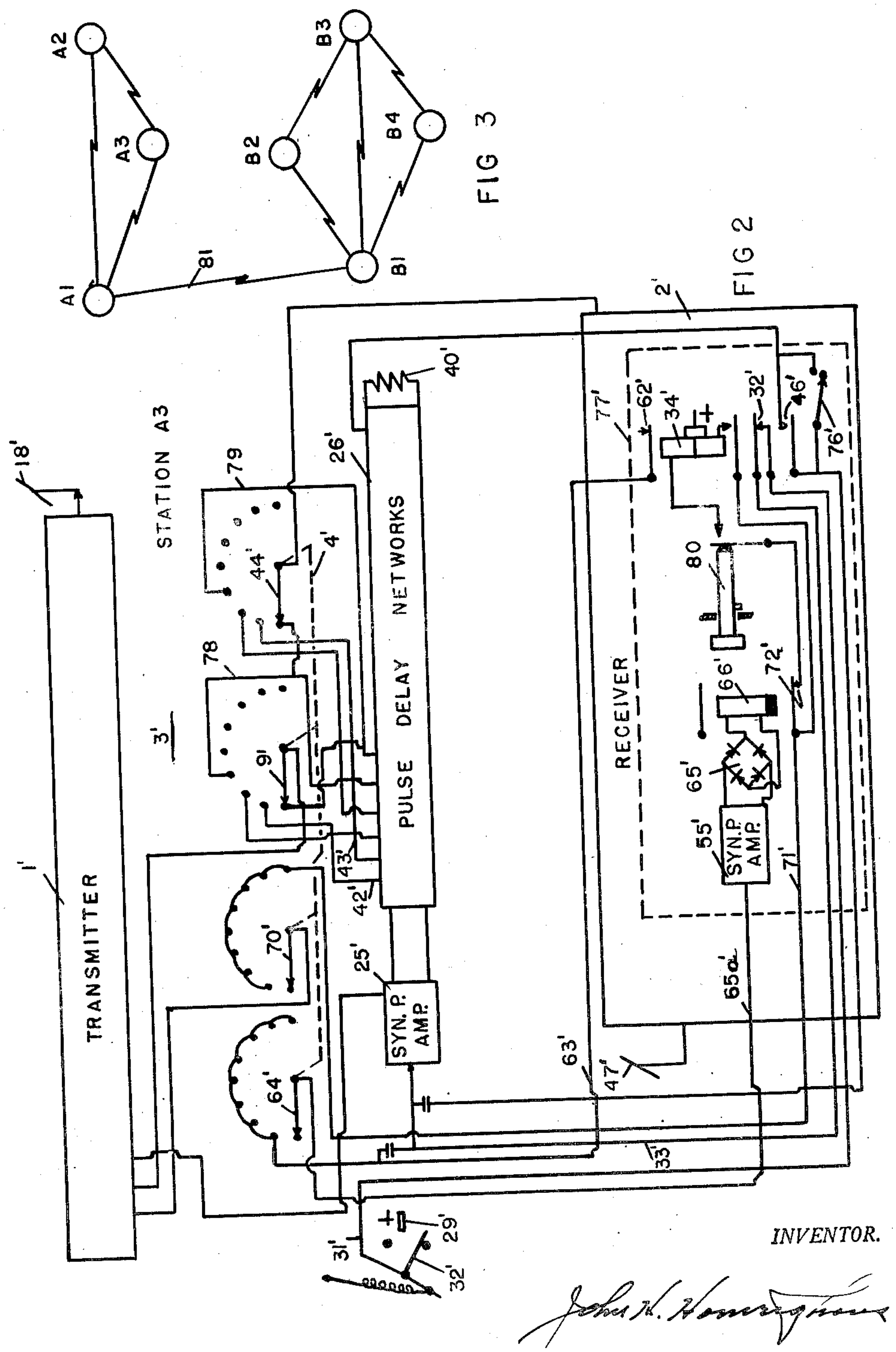
Figure 3 is a diagrammatic illustration of two radiophone systems with different groups of mobile and fixed stations.

Describing first the transmitter for a mobile or fixed station, the station channel selecting switch or device 4 may be in its fourth position, as shown in Figure 1, to call station No. A3, shown in Figure 2. The microphone 5 develops electrical signals representative of a message, which signals may be fed to the preamplifier 6. Removing the microphone from the switch hook 7 closes a circuit from the source of power 8 to the transmitter. The preamplifier 6 may be under control of recurring channel timing pulses produced in the circuits of pulse generator 3, to be further explained later, and fed from brush 9 engaging its fourth contact through spring contacts of key 10 to the double unit timing pulse amplifier 11. There results an increase in potential over conductor 12 during the interval of the timing pulse, which increase may be supplied to one of the control grids in the preamplifier 6 to render this tube conductive to message signals from the microphone. The output signals from amplifier 6 may be fed to the modulation amplifier amplitude modulation or frequency modulation of the signals may be employed. For frequency modulation the signals from the amplifier 13 may be applied 13 and from this amplifier to the oscillator 14 and then applied to the frequency multiplier 15 to produce a high frequency modulated carrier wave which may be fed to the gating amplifier 16. The amplifier 16 may be under control of the timing pulses supplied over conductor 12 to render it conductive only during the interval of the timing pulses, whereby the modulated carrier wave may be intermittently fed to the power amplifier 17 and in turn to the antenna 18. The oscillator 14 may be adjustable through the member 19 in order that stations served by different carrier waves may be called from the station in Figure 1.

The preamplifier 20 and the gating amplifier 21 may control the transmission of synchronizing signal pulses from the pulse generator 3.

The oscillator 14 and the frequency multiplier 15 may be removed from the transmitter by the switches 22 and 23 to apply the signals from the modulation amplifier 13 to the gating amplifier 16. Another oscillator 24, adjustable to produce several carrier wave frequencies, may coact with the gating amplifiers 16 and 21 to produce an amplitude modulated carrier wave.

The equipment 3, common to both the transmitter 1 and receiver 2, may comprise a pulse generator having a pulse amplifier or an electron tube 25 and pulse delay networks 26 for producing recurring synchronizing pulses, a plurality of recurring channel timing pulses, and a multi-position channel selecting switch 4 for selecting by station number channel timing pulses produced in the delay networks 26 for controlling communication paths to the several stations in the system.

Assuming that station A1 in Figure 1 is initiating a call for station A3 in Figure 2, then the brushes in the multi-position switch 4 would be rotated to their fourth position as shown in the drawing to select the particular channel timing pulses for station A3. The various positions of the switch 4 may be numbered to correspond to the station numbers in the system. The calling party at station A1 may through the toggle switch 27 cause a positive pulse of relatively short duration to be applied to the grid 28 in tube 25 from positive potential at 29, spring 30, conductor 31, relay spring contacts 32 and conductor 33. The relay 34 is energized when synchronizing signals are not being received in the receiver 2, to be explained in more detail later.

The momentary pulse on the grid 28 may render the right unit of tube 25 more conductive to produce a relatively high amplitude pulse at load resistor 35, which pulse may be applied through a condenser 36 to a first control grid in the preamplifier 20, and to a second control or gating grid, which may be connected to the load resistor 35 so that a lower potential during the interval between synchronizing pulses is supplied to the second grid to render the tube 20 non-conductive during these intervals. The potential changes at the load resistor 35 are also applied to a control or gating grid in the amplifier 21 to render this tube conductive during the periods for the recurring synchronizing pulses to supply the pulse modulated carrier wave through stage 17 to the antenna 18.

The synchronizing signal pulse produced at the load resistor 35 may be fed to the delay or artificial line 26 comprising a series of inductors 37, shunt inductors 38 and condensers 39 terminating in a load resistor 40, to in turn produce a plurality of trains of channel timing pulses separated in time sequence. For simplicity only a few sections of the delay line or network are shown in detail, but it will be understood that other sections would be required to produce the necessary channel timing pulses for the several stations in the system, as indicated by dashed lines.

A conductor 42, supplying first channel timing pulses from the delay network 26, may be connected to the second contact for brush 9 to control message signal transmission, as explained above. A conductor 43, supplying second channel timing pulses from network 26, may be connected to the second contact for brush 44 to control mesage signal reception, as will be explained later. In like manner conductors supplying each of the following two channel timing pulses from the delay network 26 may be connected to the third, fourth, etc. contacts for the brushes 9 and 44, as shown in Figure 1. The last timing pulse produced in the network 26 may be fed over conductor 45, through spring contacts 46 to the grid 28 in tube 25 to initiate another synchronizing signal pulse and another series of timing pulses, which process will be repeated in successive rotation. The brushes 9 and 44 may be rotated to any set of contacts to select two channel timing pulses for a communication path to a called station.

In the present communication system any station initiating a call may transmit signals over the first channel in a two-channel path and receive signals over the second channel. Therefore, the brushes 9 and 44 in positions two through six may select the timing pulses to control message signal transmission and reception. To receive a call the switch 4 may be in normal position, or each brush may be engaging its first contact. Since the station in Figure 1 is designated A1, the letter A indicating the carrier wave and the numeral 1 to indicate the station call number, a subscriber at any other station in the system may call station A1 by rotating its timing pulse selecting switch to the first set of contacts. Therefore, the first set of contacts for brushes 9 and 44 is supplied timing pulses from conductors 43 and 42 respectively so that station A1 when called may receive message signals over the first channel and transmit signals over the second channel in its assigned communication path, which order is the reverse of that when initiating a call.

In the receiver 2 the antenna 47 may receive a carrier wave modulated with message signals and synchronizing signal pulses when transmitted from another station such as shown in Figure 2. The modulated carrier wave may be fed to the radio frequency amplifier 48. One antenna may be employed for both the transmitter and receiver since transmission and reception occur during different periods. An oscillator 49 reacts with the carrier wave in the first detector or mixer stage 50 on the heterodyne principle to produce an intermediate frequency which may be supplied to the amplifier 51. After suitable amplification in stage 51 the intermediate signals may be supplied through the limiter stage 52 to the discriminator 53; after detection in the discriminator the signals are fed to the output gating amplifier 54 and synchronizing pulse amplifiers 25 and 55. In making a call the amplifiers 25 and 55 may be responsive to synchronizing signals received from another station. The output amplifier 54 is under control of channel timing pulses supplied through brush 44 to the double unit amplifier 56 to produce a relatively high amplitude pulse at load resistor 57, which pulse in turn is applied to the control or gating grid in stage 54 to render the output amplifier conductive only for the duration of the channel pulse. Message signals from stage 54 may be supplied to the loud speaker 58. The stage 56 may be similar to stage 11 in the transmitter. By the operation of switches 59 and 60 the limiter 52 and the discriminator 53 may be replaced by the second detector 61 for amplitude modulated signals.

In initiating a call from the station Figure 1 the brushes in switch 4 are rotated to the contacts which may be numbered for a called station. Then assuming that synchronizing signals are being transmitted from another station, they would be received after detection through relay contacts 62 and supplied over conductor 63 to the grid 28 to initiate the channel timing pulses in the network 26. Also the signals may be applied through brush 64, conductor 65a to the amplifier 55, which is biased against the lower amplitude message signals. The output is rectified at 65 to energize the slow-to-release relay 66. Relay 66 upon energizing will bring in the lamp 67 to notify the calling party that synchronizing signals are being received and it will not be necessary to initiate the recurring pulses by operation of the toggle switch 27. Now assume that synchronizing pulses are not received when initiating a call; then a circuit will be closed from ground potential at switch hook springs 68, conductor 69, brush 70, conductor 71, brake contact springs 72, since relay 66 is not energized by received pulses, and brake contacts 73 through the winding of the slow-acting or bimetallic device 74 to battery.

The slow-acting device 74 after a short interval will close a circuit from ground at springs 75, upper winding of relay 34 to battery. Relay 34 upon energizing will be locked up over conductor 71 until the switch 4 is returned to normal or the microphone is replaced on the switch hook. At this time the calling party may initiate a synchronizing pulse by operation of the toggle switch 27, and if there is no audible message from the loud speaker 58, the selected communication path may be considered idle and key 10 may be actuated to condition the transmitter for message signal transmission as explained above.

Relay 34, in addition to closing its locking circuit, will close at springs 46 the ring circuit, from conductor 45 to the grid 28, for the pulse generator in order to develop recurring pulses, as previously explained. At spring 62 the circuit to grid 28 and amplifier 55 is opened to prevent any later received synchronizing pulses from interfering with the pulse generator 3. Springs 73 open the circuit for the device 74, and at springs 32 the toggle switch circuit is closed. The station circuits will be restored to normal position by replacing the microphone on the switch hook and returning the switch 4 to normal position, which places the brushes on their first contacts.

While the delay networks 26 are shown for five stations, it is to be understood that further sections may be added for a greater number of stations, or a pulse amplifier similar to 25 may separate the sections for the fifth and sixth stationse to care for pulse attenuation.

In certain communication systems it may be desirable to have only one station in the system to transmit the synchronizing pulses. Then switch 76 would be closed in that station to connect the conductor 45 to the grid 28 and the apparatus and circuits enclosed in the dashed line block diagram 77 may be eliminated in all stations.

Assuming that the station in Figure 2 is designated A3 and is the called station, then the called party may be informed of a waiting call through the loud speaker in the receiver 2'. The station shown in Figure 2 may be similar to the station shown in Figure 1 with certain differences that will be later described. Like parts have been given similar reference numerals so that a detailed description is thought to be unnecessary. The switch 4' would be in normal or stand-by position.

Synchronizing signals received through the antenna 47' after detection may be applied over conductor 63' to the amplifier 25' to in turn produce in the network 26' channel timing pulses during the same periods as those produced in station A1. Since the station number is 3, the channel timing pulses required for the first channel in its assigned communication path may be applied over conductor 78 to the fourth contact for brush 9', and to the first contact for brush 44' to control message signal reception from the calling station. The channel timing pulses required for the second channel in its assigned communication path may be applied over conductor 79 to the fourth contact for brush 44', and to the first contact for brush 9' to control message signal transmission to the calling station.

In the receiver 2' a manually operated key 80 is provided, in place of the automatic slow-acting device 74 shown in Figure 1, to control the energization of relay 34'.

Referring to Figure 3, I have shown two different groups of radiophone stations, each served by a different carrier wave, which is indicated by the letter prefix. Any station may be a mobile or fixed station, and any station in group A may call any other station in group A or, by oscillator adjustment, any station in group B, as indicated for stations A1 and B1 by the line 81. Likewise any station in group B may call any other station in group B or A.

In the various circuits shown and described I have simplified the drawings by indicating the source of potential by a sign. Also I have omitted the heater filaments for the various tubes, but it will be understood that such filaments are necessary.

The embodiments of the invention which have been given herein are illustrations of ways the various features may be accomplished and of the principles involved. It is to be understood that the invention contained herein is capable of embodiment in many other forms and adaptations, without departing from the spirit of the invention and the scope of the appended claims.

Having thus described my invention, I claim:

1. In a communication system, a first radio station, generator means at said station to produce a synchronizing pulse and a first series of timing pulses in successive rotation, transmitter means at said station to transmit said synchronizing pulses, a second radiophone station, receiver means at said second station to receive said synchronizing pulses, generator means at said second station under control of said received synchronizing pulses to produce a second series of recurring timing pulses occurring at substantially the same time as said first series of timing pulses, a first pair of the said timing pulses produced at the said second station controlling a communication path for receiving and answering calls, and manually operable means at said first station to select a pair of timing pulses produced thereat corresponding to said first pair of timing pulses to control message signal transmission and reception at said first station over the said communication path.

2. In a communication system, a plurality of radiophone stations, generator means at a first one of said stations to produce a recurring synchronizing pulse and a plurality of series of first timing pulses, transmitter means at said first station to transmit said recurring synchronizing pulse during a recurring period of time, receiver means at each of the other said stations to receive said recurring synchronizing pulse during said recurring period, generator means at each of the said other stations under control of said received recurring synchronizing pulse to produce a plurality of series of second timing pulses occurring at substantially the same time as said plurality of series of first timing pulses, a different pair of said series of second timing pulses to control a communication path at each of the said other stations for receiving and answering calls.

3. A communication system as claimed in claim 2 wherein there is provided operable means at said first station to select a pair of said series of first timing pulses produced thereat to control the transmission and reception of message signals to and from a desired one of the said other stations.

4. A communication system as claimed in claim 2 wherein there is provided means at each of the said stations to produce carrier waves of the same frequency and to transmit these carrier waves with message signal modulation during different recurring periods of time.

5. In a transmitter-receiver station, means to produce a carrier wave, pulse generator means comprising at least one electron tube and an associated pulse delay network coupled in series relation to produce a recurring synchronizing pulse and a plurality of recurring time pulses, transmitter means to transmit said synchronizing pulses over said carrier wave, means including a station calling device and suitable circuits to select a first one and a second one of said timing pulses, said first selected timing pulse to control said transmitter means for message signal transmission over said carrier wave during a first recurring period of time, and receiver means under control of said second selected timing pulse to control reception of message signals during a second recurring period.

6. In a transmitter-receiver station, means to produce a carrier wave, receiver means to receive a recurring synchronizing pulse, pulse generator means comprising at least one electron tube and an associated pulse delay network under control of said received synchronizing pulses to produce a plurality of recurring timing pulses, and a multi-position switch in normal position and suitable circuits controlled thereby to select a first one and a second one of said timing pulses, said first selected timing pulse to control said receiver means for message signal reception during a first recurring period of time, and transmitter means under control of said second selected timing pulse to control the transmission of message signals over said carrier wave during a second recurring period.

7. In a transmitter-receiver station, means to produce a carrier wave, pulse generator means comprising at least one electron tube and an associated pulse delay network to produce spaced synchronizing pulses, transmitter means to transmit said synchronizing pulses over said carrier wave, receiver means to receive other synchronizing pulses, and means comprising a slow-acting device and a relay controlled thereby to prevent the received said other synchronizing pulses from interfering with the transmission of said spaced synchronizing pulses.

8. In a transmitter-receiver station, means to produce a carrier wave, pulse generator means comprising at least one electron tube and an associated pulse delay network to produce spaced synchronizing pulses, transmitter means to transmit said synchronizing pulses over said carrier wave, receiver means to receive other synchronizing pulses, and means comprising a manually operable member and an associated relay to prevent said other synchronizing pulses from interfering with the transmission of said spaced synchronizing pulses.

9. In a transmitter-receiver station, a channel timing pulse generator comprising pulse delay networks responsive to synchronizing pulses produced at said station or received synchronizing pulses to produce a plurality of pairs of recurring timing pulses, and operable means to select said pairs of timing pulses for controlling the transmission and reception of message signals at said station during different recurring periods of time.

10. In a transmitter-receiver station, pulse generator means comprising at least one electron tube and an associated pulse delay network to produce spaced synchronizing pulses, transmitter means adapted to transmit said synchronizing pulses, receiver means adapted to receive other synchronizing pulses, and means comprising rectifiers responsive to said other synchronized pulses and a relay controlled thereby for blocking transmission of said spaced synchronizing pulses from said transmitting means.

11. In a radio station, a transmitter and a receiver, a pulse generator comprising at least one electron tube and associated pulse delay networks to produce recurring synchronizing pulses and a plurality of recurring timing pulses, manually operable means to select a first one and a second one of said timing pulses, said transmitter to transmit said synchronizing pulses, a timing pulse routing key operable to route first selected timing pulses to said transmitter, said transmitter under control of said first recurring timing pulse received through said key to transmit message signals during a recurring period of time, and said receiver under control of said second recurring timing pulse to receive message signals during a different recurring period.

12. In a communication system, a first group of radiophone stations arranged for signal transmission and reception over a first carrier wave and a second group of radiophone stations arranged for signal transmission and reception over a second carrier wave, generator means at a first station in said first group to produce a recurring synchronizing pulse and a plurality of recurring timing pulses, an oscillator at said first station having an adjustable member to produce said first carrier wave or said second carrier wave, transmitter means at said first station, including said member to select one of said carrier waves according as a called station is in said first group or said second group of stations, to transmit said synchronizing pulses thereover, and manually operable means at said first station to select a first one of said timing pulses to control said transmitter means for message signal transmission over the said selected carrier wave during a recurring period of time.

13. In a communication system, a plurality of numerically designated radiophone transmitter-receiver stations, pulse generator means at a first one of said stations comprising an electron tube and an associated pulse delay network coupled in series relation to produce a recurring synchronizing pulse and a plurality of pairs of recurring timing pulses, each pair of said recurring timing pulses for a different one of said stations, means at said first station to produce a carrier wave, transmitter means at said first station to transmit said synchronizing pulses over said carrier wave, a station calling device at said first station rotatable according to the number of a second one of said stations to select a pair of said recurring timing pulses, a first one of the said selected recurring timing pulses to control said transmitter means for message signal transmission over said carrier wave during a recurring period of time to said second station.

14. In a communication system as claimed in claim 13 wherein there is provided receiver means at said first station under control of a second one of the selected recurring timing pulses to receive other message signals during another recurring period of time.

15. In a communication system as claimed in claim 13 in combination with means at said second station to receive said synchronizing pulses, generator means at said second station comprising delay networks under control of said received synchronizing pulses to produce a plurality of pairs of other recurring timing pulses, and another station calling device at said second station in normal position to select a pair of said other timing pulses, corresponding in time relation to the said pair of selected timing pulses at said first station, to control message signal reception from said first station and message signal transmission to said first station.

16. In a numerically designated first radio station, a first transmitter and a first receiver, means to produce a first carrier wave, pulse generator means including an electron tube and an associated pulse delay network coupled in series relation to produce a recurring synchronizing pulse and a plurality of pairs of recurring timing pulses, means associated with said transmitter to transmit said carrier wave during a first recurring period of time modulated with said synchronizing pulses, a station calling device at said station operable according to the number of a second radio station to select a pair of said recurring timing pulses, a first one of said selected recurring timing pulses to control said transmitter to transmit said carrier wave during a second recurring period modulated with signals representative of a first message, a second one of said selected recurring timing pulses to control said receiver during a third recurring period for reception of signals representative of a second message.

17. In a numerically designated radio station, a transmitter and a receiver, means to produce a carrier wave, pulse generator means including an electron tube and associated pulse delay network to produce a series of spaced synchronizing pulses and a plurality of pairs of recurring timing pulses intermediate said synchronizing pulses, means associated with said transmitter under control of said synchronizing pulses to transmit said synchronizing pulses during a first recurring period of time amplitude modulated on said carrier wave, a station calling device at said station rotatable according to the number of another station to select a pair of said recurring timing pulses, a first one of said selected recurring timing pulses to control said transmitter to transmit signals representative of a first message during a second recurring period amplitude modulated on said carrier wave, a second one of said selected recurring timing pulses to control said receiver during a third recurring period for reception of signals representative of a second message.

18. In a numerically designated radio station, a transmitter and a receiver, means to produce a carrier wave, pulse generator means including an electron tube and an associated pulse delay network to produce a series of spaced synchronizing pulses and a plurality of pairs of recurring timing pulses intermediate said synchronizing pulses, means associated with said transmitter to transmit said synchronizing pulses during a first recurring period of time frequency modulated on said carrier wave, a station calling device at said station rotatable according to the number of another station to select a pair of said recurring timing pulses, a first one of said selected recurring timing pulses to control said transmitter to transmit signals representative of a first message during a second recurring period frequency modulated on said carrier wave, a second one of said selected recurring timing pulses to control said receiver during a third recurring period for reception of signals repersentative of a second message.

19. A radio station as claimed in claim 16 in combination with a second receiver at said second station to receive said synchronizing pulses, a second transmitter associated with said second station, means associated with said second station to produce a second carrier wave, generator means at said second station including another electron tube and an associated pulse delay network coupled in series relation under control of said received synchronizing pulses to produce a plurality of pairs of other recurring timing pulses, another station calling device at said second station in normal position to select a pair of said other recurring timing pulses corresponding in time relation to the said pair of selected timing pulses at said first station, a first one of said other selected recurring timing pulses to control said second receiver during said second recurring period for reception of signals representative of said first message, a second one of said other selected recurring timing pulses to control said second transmitter to transmit said second carrier wave during said third recurring period modulated with signals representative of said second message.

20. In a communication system, a radio station, a signal transmitter and a signal receiver associated with said station, means associated with said transmitter to produce a first carrier wave, means associated with said receiver to receive a second carrier wave, pulse generator means associated with said transmitter and said receiver including an electron tube and an associated pulse delay network to produce a plurality of pairs of recurring timing pulses, a station calling device associated with said transmitter and said receiver operable according to the number of a second radio station to select a pair of said recurring timing pulses, signal terminal means associated with said transmitter comprising an outgoing amplifier and suitable circuits under control of a first one of said selected timing pulses to control message signal transmission over an outgoing channel in said first carrier wave during a first recurring period of time, and signal terminal means associated with said receiver comprising an incoming amplifier and suitable circuits under control of a second one of said selected timing pulses to control message signal reception from an incoming channel in said second carrier wave during a second recurring period.

JOHN H. HOMRIGHOUS.

REFERENCES CITED

The following references are of record in the file of this patent:

UNITED STATES PATENTS

| Number | Name | Date |
|---|---|---|
| 2,172,354 | Blumlein | Sept. 12, 1939 |
| 2,199,179 | Koch | Apr. 30, 1940 |
| 2,212,173 | Wheeler et al. | Aug. 20, 1940 |
| 2,266,401 | Reeves | Dec. 16, 1941 |
| 2,406,165 | Schroeder | Aug. 20, 1946 |
| 2,414,265 | Lawson | Jan. 14, 1947 |
| 2,418,116 | Grieg | Apr. 1, 1947 |
| 2,429,613 | Deloraine et al. | Oct. 28, 1947 |
| 2,471,138 | Bartelink | May 24, 1949 |